May 24, 1938.  E. DUTCH  2,118,376
METHOD FOR EXTENDING PIPE LINES UNDER PRESSURE
Filed March 16, 1935
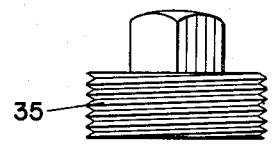
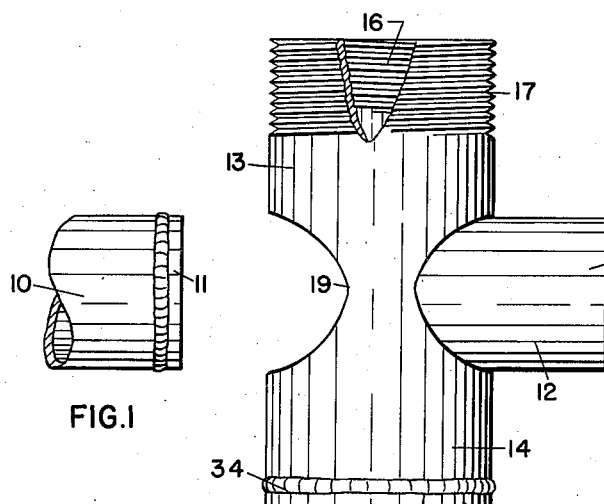
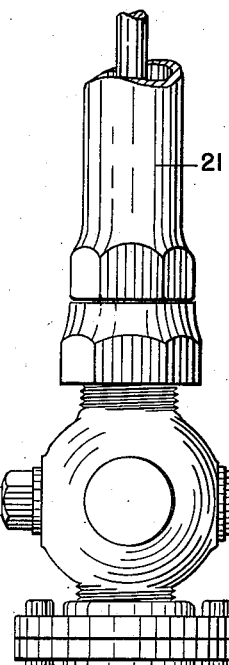
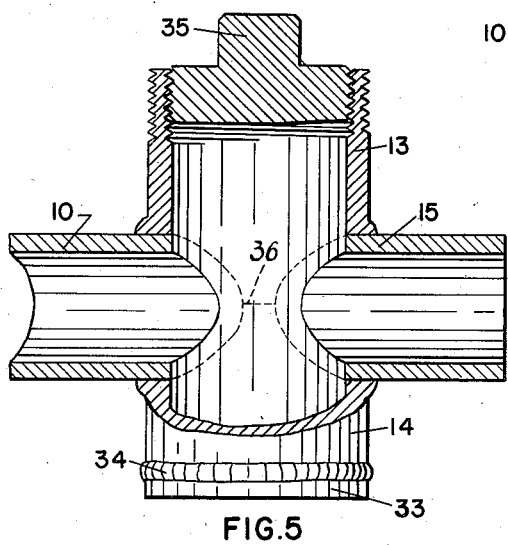
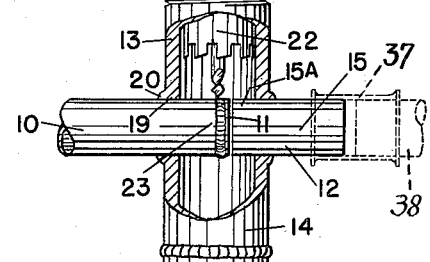
EMERY DUTCH
*INVENTOR.*
BY *Julian J. Wittal*
*his* ATTORNEYS.

Patented May 24, 1938

2,118,376

UNITED STATES PATENT OFFICE 2,118,376

METHOD FOR EXTENDING PIPE LINES UNDER PRESSURE

Emery Dutch, Bronx, N. Y.

Application March 16, 1935, Serial No. 11,433

1 Claim. (Cl. 137—73)

This invention relates to a method for extending pipe lines under pressure without the necessity of shutting them off and without substantial loss of pressure or fluid.

The main object of my invention is to provide a method for accomplishing the operation characterized hereinbefore in a simpler, less expensive and more efficient manner than has been done heretofore.

In the drawing accompanying this specification and forming a part thereof:

Fig. 1 is a side elevation of the end of an existing pipe line, usually called the "dead end", and being sealed, as indicated in the drawing, by welding a disk or cap on the termination thereof;

Fig. 2 is a pipe member, preferably in the form of a T, adapted to be secured on the dead end shown in Fig. 1, and to be used during the practise of my invention, as will appear as this specification proceeds;

Fig. 3 is a closing or sealing plug which may be used to seal the upper end of the T shown in Fig. 2;

Fig. 4 is an elevational assembly, parts of the same being broken away, showing the assembling of the parts hereinbefore described and a drilling machine used in the practise of my invention;

Fig. 5 is a sectional elevation showing a form of the extension executed according to my invention.

Referring now to the drawing more closely by characters of reference, the numeral 10 indicates the existing pipe line which it is desired to continue at the dead end 11 thereof.

For this purpose, I first prepare a pipe member, generally indicated by the numeral 12, and designated as the "T head" in the form of a T, said member having, in the embodiment shown in Fig. 2, an upwardly extending transverse open branch 13, a downwardly extending transverse branch 14, closed as indicated at 33 and 34, the two branches preferably being of one integral piece of a pipe and obviously being co-axial and identical in inner diameter, and said T pipe member 12 also showing a longitudinal branch 15 which may generally serve as a continuation of the main pipe line 10 when desired.

The upwardly extending branch 13 is threaded internally at its upper end as indicated at 16 and also show outer screw threads 17; such outer threads to be used for attaching a drilling apparatus, valve, etc. and later in the sealing of said end externally with a cap if so desired.

In practising my invention, I first secure the T head 12 on the dead end 11 through its appropriately formed opening 19 fitting on the pipe line 10, as illustrated in Fig. 4, the edges of said opening 19 being securely welded on the outer surface of the main pipe line 10, as at 20, so as to form a secured and sealed connection therewith. An appropriate drilling machine, generally indicated by the numeral 21, many of which are well known in the art and the one I preferably intend to use being known as the Moeller machine, is now secured on the upper end of the branch 13, and through its core drill 22, the dead end 11 and a portion 23 of the main pipe line 10 within the T head 12 will be severed on the downgoing trip of said core drill 22 and will be upwardly lifted and removed by the return trip thereof through the machine 21, in a manner well known in the art, the upper transverse branch 13 being all the time sealed through the well known operation and construction of a drilling machine 21 of the type indicated. It is obvious that instead of the horizontal or longitudinal branch 15 of the T a separate pipe 15 may be employed (Figs. 4 and 5) welded into the pipe 13, 14 and its possible inner extension 15a will also be removed by the core drill.

Through all these operations, the transverse lower branch 14 of said T head is closed.

When this operation or step is finished, the upper opening of the branch 13 may be taken care of, as by an appropriate plug 35 (Fig. 3), or by any other suitable and desired means.

In Fig. 5, I show the final result of the earlier operations for extending the "dead end", plug piece 35 being screwed into the upper end of the branch 13 to seal the same in a temporary or in a final manner, said plug 35 being passed through the machine 21 without permitting the escape of the fluid in the pipe line 10 after the removal of the core drill, as it will be understood by those versed in this art, the outer threads 17 then may be used for a closing cap which is a standard practise in the pipe industry, to keep out dirt, water, etc. The pipe 13, 14 in practise may be of two pieces 13 and 14 appropriately fitted and welded on the pipes 10 and 15, respectively, and to one another, as indicated at 36 in Fig. 5.

The hereinbefore description is to illustrate the practise of my invention by way of example only, and it is to be understood that changes and variations may be made in the constructions, details and steps thereof, and I hereby reserve all my rights to any and all such changes as are within the spirit of the invention and the scope of the appended claim.

Such a change may consist in making the longitudinal or horizontal branch 15 of the T head as a separate pipe, as indicated in Fig. 4. It is also understood that the branches 13 and 14 will have to be of larger diameter than the main line 10.

Finally, I obviously also may provide a ready "T head" of my invention for any "dead end" of a pipe line when originally installing the same, and which will be easily and efficiently ready and available any later time when a necessity for the extension of said "dead end" arises.

In Fig. 4, I illustrated by dotted lines and in a diagrammatic manner the connection of the branch 15 of the T head to the new extension system, the connection being indicated by the numeral 37 and the beginning of the usual extension system by 38.

What I claim as new is:

A method of axially extending a main pipe line under pressure at a closed or dead end thereof, consisting in securing in a sealed manner a transverse pipe on said main pipe line at said end in such a manner, that said end is within the enclosed space of said transverse pipe, one end of said transverse pipe being open, while the other end is closed; securing an extension of said main pipe line to said transverse pipe in communication with the space in said transverse pipe and removing the parts of said main line and said main pipe extension within said transverse pipe through the open end thereof, substantial without loss of pressure or fluid.

EMERY DUTCH.